Sept. 8, 1970 R. G. KOBETSKY 3,527,402
SPINDLE ASSEMBLY
Filed Feb. 5, 1969
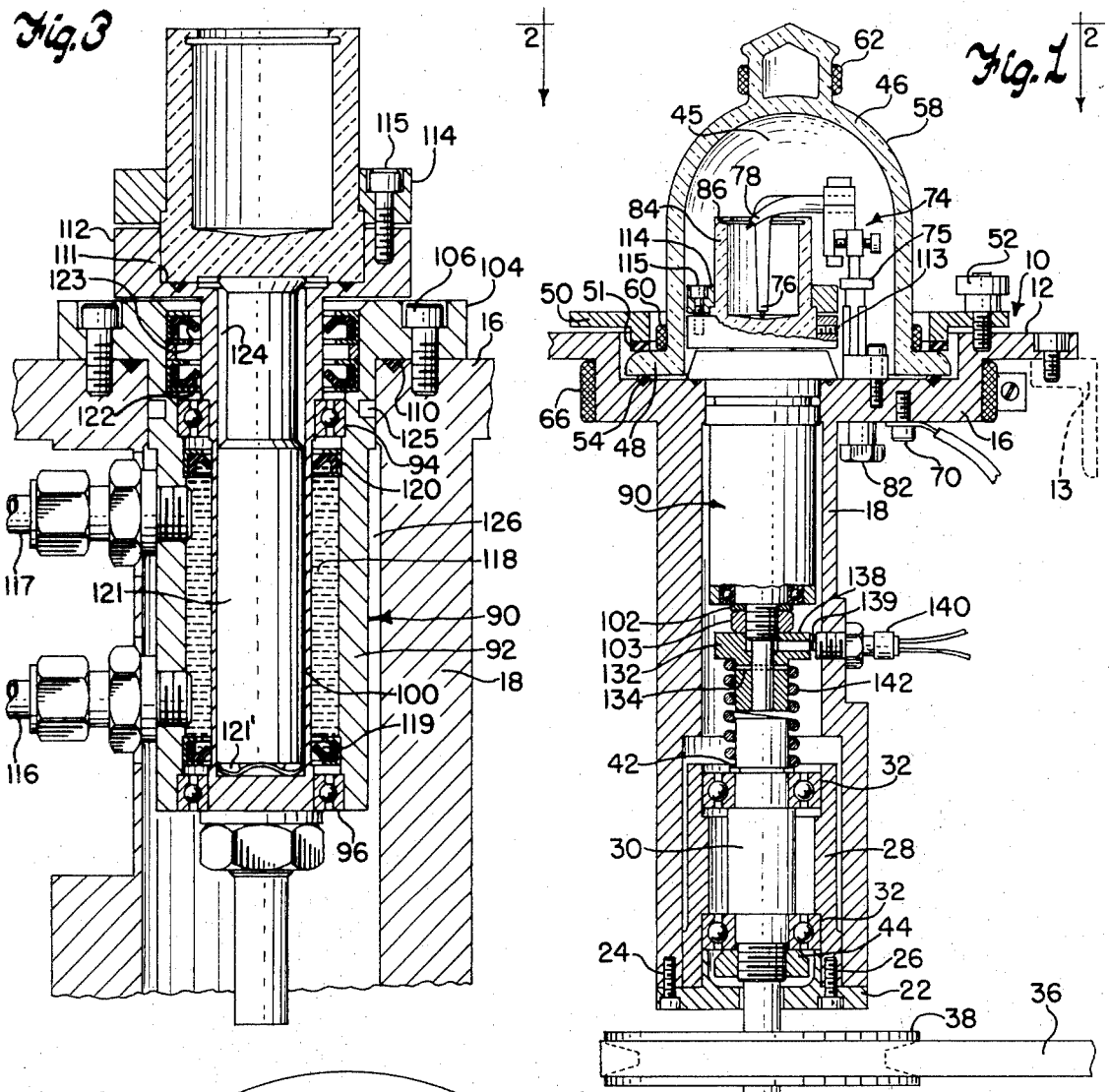
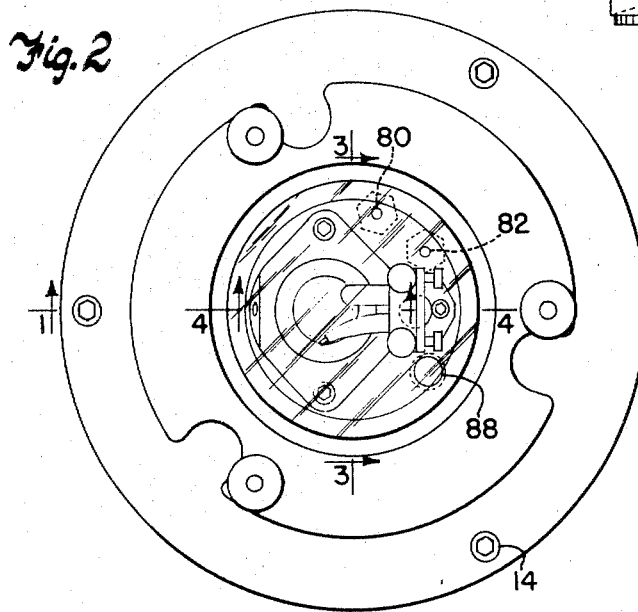
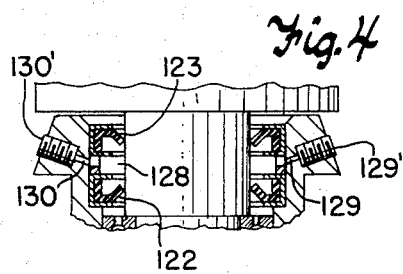
INVENTOR.
Robert G. Kobetsky
BY Barry L. Clark
Robert W. Beart
His Att'ys United States Patent Office 3,527,402
Patented Sept. 8, 1970

3,527,402
SPINDLE ASSEMBLY
Robert G. Kobetsky, Chicago, Ill., assignor to Illinois Tool Works Inc., Chicago, Ill., a corporation of Delaware
Filed Feb. 5, 1969, Ser. No. 796,664
Int. Cl. B04b 9/00
U.S. Cl. 233—23                              10 Claims

ABSTRACT OF THE DISCLOSURE

Spindle assembly for rotatable centrifuge cup adapted to be spun in a controlled pressure atmosphere in a reaction chamber covered by a bell jar. The spindle assembly has precision bearings, vacuum seals, and a vibration absorbing coupling which engage and surround a spindle shaft. The assembly is formed as a flanged top tubular cartridge which may be quickly and readily mounted in a housing and coupled to a drive shaft. To insure that vapors within the reaction chamber will condense only on the inner surface of the cup, the spindle shaft may be selectively cooled so as to lower the temperature of the cup which it supports.

BACKGROUND OF THE INVENTION

Field of the invention

This invention relates to centrifuges and particularly to devices for mounting the same for rotation in a controlled pressure atmosphere.

Description of the prior art

In European J. Biochem. 1 (1967) an article entitled "A Protein Sequenator" written by P. Edman and G. Begg of the St. Vincent's School of Medical Research in Melbourne, Victoria, Australia appears on pages 80–91. The protein sequenator described in the article is an instrument for the automatic determination of amino acid sequences in proteins and peptides. By utilizing the phenylisothiocyanate reaction for determining amino acid sequences, the degradation of any sequence, regardless of length, is theoretically feasible. The sequenator device accomplishes the degradation by repeating a chemical process cycle so that in excess of 98% of each successive amino acid in the sequence is removed during each cycle of operation. Each cycle utilizes various mechanical operations such as, for example, extractions, centrifugations and dryings. Since it takes a cycle time of about one and one half (1½) hours to collect each amino acid, and since there are often in excess of thirty amino acids in a sequence, it will be readily seen that the device must be capable of operating for two or more days without stopping. Obviously, such continuous operation in a controlled, often corrosive, pressurized atmosphere or in a vacuum presents problems in maintaining the bearings and seals which are necessarily incorporated in the device.

In the particular sequenator device described in the previously referenced article, a special electric motor has been disclosed which requires a special shaft extension for driving the rotating reaction cup directly. The shaft extension enters the vacuum chamber through a pair of face-to-face rubber lip seals which have a void between them filled with a lower vapor pressure vacuum oil. This driving arrangement is effective for its purpose, but is exceedingly difficult to service when the bearings wear out or the seals deteriorate due to the chemical reagents and solvents introduced into the rotating cup. In order to change the seals, it is necessary to painstakingly disassemble and assemble a considerable portion of the device including various electrical and chemical connections.

One particular limitation which exists with the sequenator described in the previously referenced article is that it is restricted to usage with a relatively small group of reagents and solvents which are chemically stable at the elevated temperatures which exist in the rotating reaction cup. The elevated temperatures are necessary due to the fact that the cup is heated by the rotating spindle which carries heat to the cup which is generated by friction in its bearings and seals. Other heat is introduced by a heated base plate. As solvents or reagents which are at room temperature are periodically introduced to the rotating cup, they are immediately vaporized and quickly saturate the existing atmosphere in the reaction chamber. Upon saturation, the vapor seeks the coolest surface in the entrapping area and proceeds to condense on this surface. In severe cases, a flow of solvent or reagent is established from the inside walls of the cup to the coolest area. This is detrimental and intolerable for several reasons: If the vapors condense on the glass bell jar one may not further observe the physical action taking place in the cup. Also, if the vapors condense outside of the cup, the volumetric concentration of a chemical mixture is constantly changing. If, as during a reaction stage, a mixture is loaded and then input flow stopped, one of the more volatile constituents of the mixture could be completely exhausted, thus rendering the reagent useless.

To insure that the inside surface of the glass cup will be the coolest surface in the reaction chamber area, the bell jar surrounding the reaction chamber is heated to a temperature higher than the cup. However, with all of the forms of heat introduced to the reaction chamber, it has not been possible to maintain a temperature in the reaction cup of less than about 50° C. Accordingly, a large number of reagents and solvents used in prior art non-automatic degradation devices cannot be used since they do not react properly at temperatures higher than about 35°–40° C.

SUMMARY

It is an object of this invention to provide an easily serviceable precision spindle assembly.

It is another object of this invention to provide a spindle assembly for a centrifuge device which includes means for cooling the spindle so as to counteract increases in temperature of the spindle and a cup attached thereto caused by friction between the spindle shaft and its bearings and seals.

These objects are obtained by the spindle assembly of the present invention wherein a spindle shaft is mounted by a pair of upper and lower bearings within a tubular member having a supporting flange at its upper end. An enlarged portion at the upper end of the spindle shaft includes means for attaching a centrifuge cup to the spindle shaft and for adjusting the axis of the cup into alignment with the axis of the shaft. Sealing means are positioned between the tubular member and the spindle shaft at a point above the upper bearings. The spindle assembly, which is formed as a cartridge, is readily mounted to the housing of a centrifuge device by placing it within an opening in the housing and affixing it thereto. As the spindle cartridge is assembled downwardly into the opening of the housing, the lower end of the spindle shaft is brought into engagement with a vibration absorbing coupling on the end of a power shaft which is mounted for rotatable movement within the housing.

In order to be able to utilize a wide variety of commonly accepted reagents and solvents in the degradation cycle, it has been found desirable to control the temperature of the cup. To accomplish this, the device of the invention may include coolant sealing means between the spindle shaft and tubular member for permitting a cooling fluid to be pumped into the cartridge and circulated in contact with the spindle shaft to cool the shaft and the reaction cup attached thereto. By forming the spindle shaft as a hollow housing and inserting a core member in its center which has high thermal conductivity, and which is insulated from contact with portions of the housing which are heated by the spindle bearings and seals, the cup can be chilled very efficiently. Furthermore, its temperature can be closely regulated by varying the amount of cooling and heating which takes place.

The foregoing and other objects, features and advantages will be apparent from the following more particular description of a preferred embodiment thereof, as illustrated in the accompanying drawings.

BRIEF DESCRIPTION OF THE DRAWINGS

FIG. 1 is a partially sectioned side elevational view of my improved spindle assembly cartridge in its assembled relationship to a housing, bell jar, and drive shaft shown in section and taken along lines 1—1 of FIG. 2;

FIG. 2 is a top view of the cartridge and the housing taken on lines 2—2 of FIG. 1;

FIG. 3 is an enlarged fragmentary side sectional view taken on lines 3—3 of FIG. 2; and FIG. 4 is an enlarged fragmentary side sectional view of the top of the spindle assembly cartridge taken on line 4—4 of FIG. 2.

DESCRIPTION OF THE PREFERRED EMBODIMENT

The sequenator device with which my improved spindle assembly is preferably used includes a housing or base indicated generally at 10 which comprises a housing support flange 12 adapted to be attached to the main frame 13 of the device by means of retaining screws 14. A base plate 16 integrally formed with the support flange 12 has a hollow housing extension portion 18 extending downwardly from it. The lower end of the housing extension 18 is covered by a housing cover plate 22 fastened to the housing extension 18 by means of screws 24. Attached to the cover plate 22 by means of screws 26 in an inner housing member 28 which supports a rotatable drive shaft 30 by means of upper and lower drive shaft bearings 32. The rotatable drive shaft 30 is driven by means of a drive belt 36 and a pulley 38 connected to a motor (not shown). The drive shaft 30 and the drive shaft bearings 32 are held in place within the inner housing 28 by means of a snap ring 42 and a threaded lock nut 44.

Positioned above the housing 10 and cooperating with it to form a reaction chamber 45 is a bell jar 46. A flange portion 8 on the bell jar is pressed downwardly toward the base plate 16 by means of a retaining ring 50, resilient sealing ring 51, and screws 52. As the bell jar flange 48 is moved downwardly toward the base plate 16 it compresses a sealing ring 54 to provide an air tight seal. The outer surface of the bell jar 46 is covered with a generally transparent conductive coating 58. The conductive coating, which may, for example, be stannous oxide, acts as a resistance heating device together with electrodes 60 and 62. The heating of the bell jar by means of the conductive coating 58 serves to prevent condensation of vapors on the inner surface of the bell jar and thus facilitates visual examination of the reaction chamber, and avoids variability of concentration of chemical mixtures.

In order to control the temperature of the various elements introduced within the reaction chamber 45 a base heating element 66 is provided which surrounds the base 16 and, by means of a thermocouple probe 70, permits the temperature of the base plate 16 to be maintained at a predetermined value.

A support assembly indicated generally at 74 adjustably, by means of adjustable collar 75, carries a feed line nozzle 76 and an effluent line nozzle 78. The feed line nozzle 76 is connected by tubing (not shown) which passes through a feed opening 80 in the base plate to a source of fluid to be transmitted through the nozzle. The effluent nozzle 78 is similarly connected to tubing (not shown) which passses through an effluent opening 82 to a location (not shown) where the effluent is collected. The nozzles 76 and 78 are directed to the interior of a reaction cup 84 which is formed very precisely, preferably of glass, so that its internal wall surfaces are parallel to each other, forming a true right circular cylinder. A groove 86 formed in the cup 84 at its upper end serves to collect portions of fluids which are fed to the cup during a reaction cycle and which travel up the sides of the cup 84 as it is rotated. The nozzle 78 is positioned within this groove 86 and serves to collect the liquid which enters the groove.

Inasmuch as the atmosphere within the reaction chamber 45 must be one of controlled pressure, of a gas such as nitrogen, and at times, a vacuum, introduced to the chamber through threaded opening 88, it is necessary that the cup 84 be rotated by a structure which will seal the reaction chamber 45 from the ambient surroundings. To prevent any undesired changes within the atmosphere within the reaction chamber, it is necessary that seals be used which will permit the cup to be rotated without permitting leakage of gases or other materials. Since the cup 84 must often be continuously rotated for days at a time and since many of the reagents and solvents introduced in the cup are corrosive in nature, it is desirable that the sealing members and bearings have a reasonably long life and yet be readily replaceable. To accomplish this purpose, I have provided a spindle assembly indicated generally at 90 which comprises a generally tubular non-rotating member 92 which contains upper and lower bearings 94, 96 respectively and a hollowed out spindle shaft 100 which is held in contact with the bearings by means of a disc spring 102 and a threaded lock nut 103. A flange portion 104 at the top of the tubular member 92 is adapted to overlie the upper end of housing extension 18 and be sealed to it by means of spindle assembly retaining screws 106 and resilient sealing ring 110.

A reaction cup 84 is affixed to the spindle shaft 100 and rests on a narrow annular portion 111 in an enlarged cup receiving portion 112 at the upper end of shaft 100. A plurality of jack screws 113 (FIG. 1) placed around the periphery of the cup receiving portion 112 permit the axis of the cup to be precisely positioned on the axis of the spindle shaft 100. This is preferably done by placing the probe of a dial indicator gauge within the cup, measuring any eccentricity of the cup axis relative to the spindle axis and correcting for it with the screws 113. Once the cup 84 is accurately positioned with its axis coinciding with the axis of the spindle shaft 100, it is fastened to the spindle shaft by means of a retainer ring 114 and a plurality of screws 115.

As previously explained herein, it has been found that a wider variety of solvents and reagents can be utilized in the reaction cup 84 if the reaction temperature can be maintained in the range of about 35°–50° C. However, because of increases in temperature of the reaction cup 84 above this range which take place due to the presence of the base heater 66, the heating of the conductive surface 58 of the bell jar plus the heat introduced by the various bearings and seals, it has been found desirable to cool the shaft 100. Where such cooling is desirable, coolant feed and discharge lines 116, 117 are attached to openings in the tubular member 92 so that coolant may be introduced into the open coolant chamber area 118 between the tubular member 92 and the shaft 100. This coolant is prevented from contatcting the bearing 94. 96 by means of a pair of coolant seals 119, 120.

In order to greatly increase the efficiency of the transfer of heat from the reaction cup 84 to the cooling chamber 118, the spindle shaft is hollowed out from its top and a highly conductive slug of metal 121 such as copper is inserted in the hollowed out portion. To insure good thermal conductivity between the copper slug 121 and the stainless steel shaft 100, a thin layer of conductive grease is used. A spring 121' dropped to the bottom of the hollowed out portion biases the slug 121 against the bottom of the reaction cup 84. Since the bearings 94 and seals 122, 123 produce considerable heat, the slug 121 is relieved at its top to provide an insulative space 124. The tubular member 92 is also relieved at 125 to reduce the downward flow of heat. Additional insulation is derived from the air gap 126 between member 92 and housing member 18.

The main seals in the spindle assembly are the vacuum seals 122, 123. These seals twpically comprise a pair of resilient lip members which have a medium such as silicone oil injected in a chamber 128 between them. The oil can be injected such as by means of a hypodermic needle placed in passageway 129. Most of the air or other gas which may be entrapped between the seals will be forced out of passageway 130 when the oil is injected. In order to insure that the seals 122, 123 are completely devoid of air which could cause an internal pressure differential during recycling of the reaction chamber 45 between a vacuum and normal atmospheric pressure the passageway 130 may be sealed by a plug 130' and a standing tube (not shown) partially filled with the oil and having a vent above the oil level attached to passageway 129. The reaction chamber 45 is then evacuated to cause the remaining air or other gas to be expelled from the chamber 128. The volume of the expelled gas will then be replaced with oil when the vacuum is removed. The standing tube is then removed and the passageway 129 sealed by a plug (129') leaving chamber 128 now completely oil filled so that an internal pressure differential is avoided during subsequent re-cycling.

At the lower end of the spindle shaft 100, a spindle adaptor member 132 is attached by means of a retaining pin 134. The spindle adaptor 132 carries a ferrous dowel pin 138 which, upon rotation of the spindle shaft 100, intermittently passes by the sensing tip 139 of a magnetic pick up head 140. By sensing the rate of rotation of the ferrous pin 138 past magnetic pick up head 140, the rate of rotation of the spindle shaft 100 may be readily determined and altered if desired.

In order to drive the spindle shaft 100 and thus the cup 84 in a vibrationless manner, the spindle shaft 100 is isolated from contact with the rotatable drive shaft 30 by means of an air gap. A coil spring member 142 surrounds the upper end of drive shaft 30 and the lower end of spindle adaptor 132. The coupling spring 142 will readily transmit the rotation of the drive shaft 30 but is capable of accommodating slight misalignment of the axes of the two shafts.

From the preceding description it will be readily seen that I have described a spindle assembly which can be assembled or disassembled from the base plate with just two screws 106 and two coolant lines if desired. Thus, spindle assembly is in the nature of a cartridge. If it is desired to replace the bearings or seals, such may be done at a location remote from the sequenator. For the utmost speed in servicing, a new cartridge can be kept on hand and immediately loaded in place as the defective one is removed.

I claim:

1. In a spindle assembly for use in the reaction chamber of a controlled atmosphere centrifuge apparatus having a bell jar in sealing engagement with the frame of the apparatus, the improvement comprising: a tubular casing member, means for mounting said casing member including flange means on said casing member adapted to overlie and be fastened to a frame plate of the centrifuge apparatus in sealed relationship thereto, a spindle shaft having an upper end portion exposable to the atmosphere in the reaction chamber and a lower end portion adapted to be driven by a rotary power source, upper and lower bearing means in said casing member for mounting said spindle shaft, and sealing means mounted within said casing member and positioned between the spindle shaft and the casing for sealing said bearings from the atmosphere in said reaction chamber.

2. A spindle assembly as defined in claim 1 wherein said tubular casing has apertures in the walls thereof adapted to receive conduits for carrying a cooling medium into the interior of said casing and into contact with said spindle shaft, and sealing means for preventing said cooling medium from contacting said bearings.

3. A spindle assembly as defined in claim 1 wherein said flange means on said tubular casing member is positioned at the top of said casing member and in surrounding relationship thereto, said sealing means being positioned interiorly of the top of said casing member.

4. A spindle assembly as defined in claim 1 wherein said spindle shaft is connected to the rotary drive shaft of a power source by a resilient coupling means, said coupling means serving to prevent vibration from being transmitted from said drive shaft to said spindle shaft.

5. A spindle assembly as defined in claim 1 wherein said coupling means comprises a coil spring which extends axially over end portions of said drive shaft and spindle shaft which are spaced from each other.

6. A spindle assembly as defined in claim 1 wherein said sealing means comprises a pair of face to face sealing members which define a chamber therebetween, sealing fluid in said chamber, and a pair of selectively closable passageways extending from said chamber and into said reaction chamber to facilitate loading of said sealing fluid into said chamber and evacuation of gases therefrom.

7. A spindle assembly as defined in claim 6 and further comprising a pair of apertures positioned in the wall of said tubular casing intermediate said bearings for carrying cooling fluid to the spindle, and sealing means for preventing said cooling fluid from contacting said bearings.

8. In a spindle assembly for use in the reaction chamber of a controlled atmosphere centrifuge apparatus having a bell jar in sealing engagement with the frame of the apparatus, the improvement comprising: a concentric housing member, a spindle shaft mounted for rotation in said concentric housing member, said spindle shaft having an upper end portion adapted to engage the bottom of a reaction cup within said reaction chamber, a pair of cooling medium sealing members positioned be- member, means for conveying a cooling medium to and from a cooling chamber defined by said pair of cooling medium sealing members and the axial portions of said spindle shaft and concentric housing member positioned between said cooling chamber sealing members, said cooling medium serving to cool said spindle shaft and the bottom of a reaction cup engaged by the upper end portion of said spindle shaft to cause the inner surfaces of the reaction cup to be cooler than any other exposed surfaces within the reaction chamber.

9. A spindle assembly as defined in claim 8 wherein said spindle shaft includes an axially extending tubular outer shell portion which terminates at its upper end in an outwardly extending flange portion which is adapted to support a reaction cup by engagement with a small outer annular portion of its lower surface, a core member mounted interiorly of said shell portion, said core member having a greater thermal conductivity than said shell portion and being adapted to be placed in resiliently biased heat conducting engagement at its upper end surface with the bottom central portion of a reaction cup, said core member further being in intimate thermal conducting relationship to said outer shell portion in the region of said cooling chamber while being in spaced insulating relationship to said outer shell portion along substantially the entire length thereof separating said cooling chamber from said upper end surface.

10. A spindle assembly as defined in claim 9 wherein said outer shell portion has bearing and sealing means mounting it for rotation relative to said concentric housing along at least a portion of said length thereof separating said cooling chamber from said upper end surface.

References Cited

UNITED STATES PATENTS

| 1,634,245 | 6/1927 | Jones et al. | 233—1 X |
| 1,806,929 | 5/1931 | Bath | 233—1 X |
| 2,957,709 | 10/1960 | Skarstrom | 233—1 X |

FOREIGN PATENTS

| 270,723 | 8/1927 | Great Britain. |

WILLIAM I. PRICE, Primary Examiner

U.S. Cl. X.R.

233—1